Nov. 15, 1927. 1,649,753

S. STRAUSS ET AL

METHOD AND MEANS FOR MEASURING ELECTRICAL RESISTANCE

Filed March 24, 1922

Inventors
Siegmund Strauss
Walter Brandt
By
Attorney

Patented Nov. 15, 1927.

1,649,753

UNITED STATES PATENT OFFICE.

SIEGMUND STRAUSS AND WALTER BRANDT, OF VIENNA, AUSTRIA.

METHOD AND MEANS FOR MEASURING ELECTRICAL RESISTANCE.

Application filed March 24, 1922, Serial No. 546,453, and in Austria April 2, 1921.

This invention relates to a method of and an apparatus for measuring the conductivity of materials, especially those of high resistance, or for measuring other factors such as the intensity of light, Röntgen rays or cathode rays or other influences which are capable of altering or affecting the conductivity of material such as rarefied air and other rarefied gas. It is based on the fact that the period of discharge of a given electric charge through a fluid, solid or gaseous medium will occupy a definite length of time if the discharge takes place between two given potentials. If the conductivity of a medium, as for example, a gaseous medium, can be altered or affected by any external influence, as, for instance, by light or Röntgen rays, then the period of discharge will be an exact measure of the intensity of such influence.

According to the method forming part of this invention, a thermionic tube or valve comprising three electrodes is used. It is a well known fact that the grid electrode of such a tube or valve, when not connected to a definite potential, will have a varying potential, especially if it is connected with its own anode or plate circuit or with the plate circuit of another thermionic tube or valve through a condenser. If such a tube or valve is left undisturbed, its grid potential will tend to become negative by virtue of the electrons projected thereon, and this potential will eventually become negative, which will prevent the flow of any current through it. In order to cause the current to again pass through the tube, the negative charge of the grid must be carried off or discharged.

According to this invention, such a discharge is rendered possible through the medium, the conductivity of which is to be measured, or is to be taken as the measuring basis for calculating the intensity of another factor acting thereon, and the period of time consumed by such a discharge can be made the basis of calculation to determine the conductivity of the material which is tested. As, however, the use of very fine instruments would be necessary to actually measure the period of time consumed by a discharge of the negative potential of the grid, starting at the precise moment the current ceases to flow through the tube and ending at the moment the grid attains a certain higher potential, it is preferable to simply count the number of discharges which take place in a given unit of time, which can be done very easily and efficiently by inserting in the plate circuit of the tube an annunciator which is capable of indicating either the initiating of a current impulse or the flow of a current therein, and counting the number of such indications within a given unit of time.

Suitable apparatus by the aid of which this method can be carried into effect is shown in the accompanying drawings wherein:—

Figure 1:
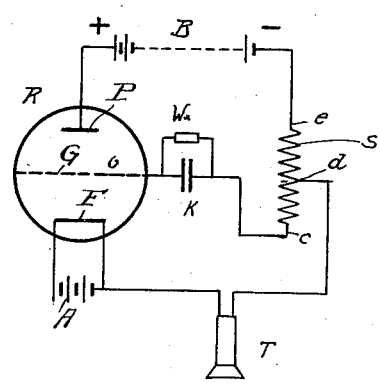
Fig. 1 shows an apparatus comprising a thermionic valve or an electronic discharge tube by means of which the method is carried into effect.

In Fig. 1 of the drawing an inductance comprising a coil S with a number of windings suitably chosen is arranged in the anode or plate circuit of the electronic discharge tube R which comprises a cathode or filament F, a grid G and an anode or plate P. The coil S is connected with the grid G of the tube through a condenser K. A battery A is connected in the filament circuit for heating the filament, and a battery B is connected in the plate circuit of the tube. A telephone T or an incandescent lamp or other indicator capable of annunciating the flow of current or the initiating of a current impulse through the plate circuit, is connected in the plate circuit of the tube. Preferably one-half $e-d$ of the inductance or coil S is inserted in the plate circuit, while the other half $d-c$ thereof may form part of the grid circuit only. The grid circuit comprises the condenser K to which the resistance $Wx$ to be measured is connected in parallel. When the plate circuit including the battery B is closed (assuming the filament F to be supplied with current from its battery A) a current impulse will pass through the tube and through the plate circuit from the battery B through the coil S and the receiver T to the incandescent cathode of the vacuum tube R. The connections of the coil S are such that it acts as an auto-transformer, the portion c—d of this coil acting, when said current impulse sets it, to induce a current which will produce a positive charge in the grid G. The positive charge in the grid will cause an increase in the current flow through the tube and this increase in current flow will further increase the positive charge in the grid. This increase of the current flow and of the positive charge in the grid potential thus continues until the so-called state of saturation of the electronic tube is reached where the characteristic curve of the tube shows a marked deflection, as is well known in the art. Then the induced positive potential at the point c of the coil S decreases as the current becomes constant or does not increase further. This increase of the positive potential at the end c of the coil S will also cause a decrease of the positive potential in the grid, and the constant projection of negative electrons from the cathode onto the grid will begin to lower the positive potential of the grid. As soon as the positive potential of the grid is lowered the anode or plate current begins to decrease, whereby a voltage of opposite direction is induced in the coil S at the point c, which in turn produces a negative charge in the grid, thus causing a further decrease of the anode current, and this negative potential in the grid will increase in the manner above described until it finally reaches a given negative value where no current at all can pass through the tube, it being a well known fact that the grid of such a tube allows passage of current through the tube if the potential of the grid does not exceed a given negative value. The flow of the plate current is now interrupted and the tube remains in an inactive state until the negative charge in the grid is carried off. This carrying off the negative charge in the grid now takes place, according to this invention, through the high resistance Wx, the value of which is to be measured, and the period of time required for the carrying off of the negative charge in the grid provides a basis for calculation of the value of such resistance. As the potential at which the plate current flow is entirely interrupted is a definite one, and as the resistance to be measured is in parallel with a condenser which carries two opposite charges at the condenser plates, the discharge occurs between two definite potentials, and the discharge period therefore provides a basis for the calculation of the value of the resistance. When the negative charge is carried off, the current again begins to flow through the tube and the whole series of operations recommences and is repeated in the way above described.

The time consumed in charging the condenser K is infinitely small, as compared with the time consumed in its discharge so that the duration of the whole operation or of a sequence of such operations is substantially determined by the time interval necessary to effect this discharge, which discharge is dependent upon the value of the resistance Wx to be measured. The value of such resistance may thus be determined from the time of discharge of the condenser K or from the number of discharge within a given time interval with precision. By the use of an annunciator T in the plate circuit, which annunciator may be a telephone, or an incandescent lamp, the necessity for calculation is avoided and instead a convenient means is provided for determining the value of the resistance. Each time the anode or plate current begins to flow, the telephone emits a crackling sound, or the bulb glows.

Thus, the number of crackling sounds or the number of glows of the lamp produced during a given period of time provides a basis from which may be ascertained, by empirically found or calculated factors, the value of the resistance which is tested.

Figure 2:
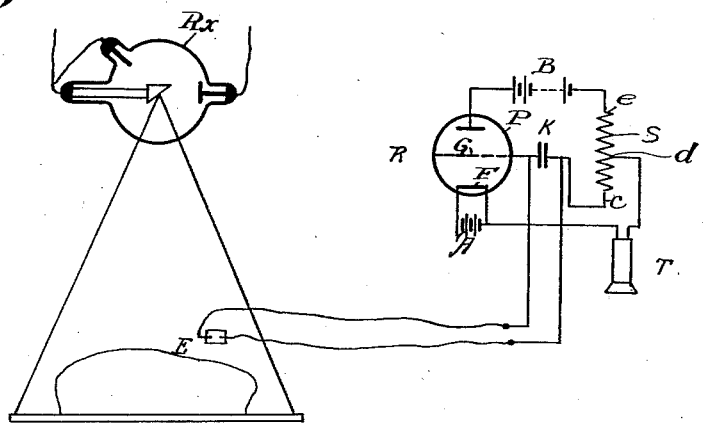
Fig. 2 shows an adaptation of the apparatus shown in Fig. 1 to the measuring of the intensity of the ionization produced by Röntgen rays, which measurement will be an exact indication of the character and intensity of the rays themselves at a definite distance from the tube.

Fig. 2 shows an apparatus by means of which the method described may be utilized for measuring the intensity of ionization that takes place by means of Röntgen-rays. In this case a small closed discharge room or chamber is connected in parallel to the condenser K and such chamber may be evacuated or it may be filled with rarefied helium and may be covered with a sheet or plate having a determined permeability to Röntgen rays. The resistance of such a discharge gap depends upon the ionization between the electrodes, which consist preferably of two plates or spheres or points arranged in close proximity to each other. When the discharge gap is brought within the zone of activity of Röntgen rays emitted from the Röntgen tube Rx, ionization takes place within said gap or room and the conductivity of the gap increases. As the resistance of the gap thus decreases the occurrence of the crackling or sounding of the receiver becomes more frequent in a given time unit. Thus the number of discharges in a given unit of time will enable a very accurate valuation of the intensity of the ionization that takes place by the action of the Röntgen tube to be determined.

It is possible by means of calculation or by empirical test, to deduce from this ionization the value of the intensity of the Röntgen rays emitted. If a photographic picture by means of Röntgen rays, or a treatment with Röntgen rays, or treatment with radium or a so-called artificial insolation is to be made, and the intensity of the rays has once been determined, it is only necessary to bring the gap E to the place where the object or person to be treated is to be located and to count the number of discharges and charges taking place in a given unit of time in order to determine with accuracy whether or not the rays have the desired character or intensity.

Figure 3:
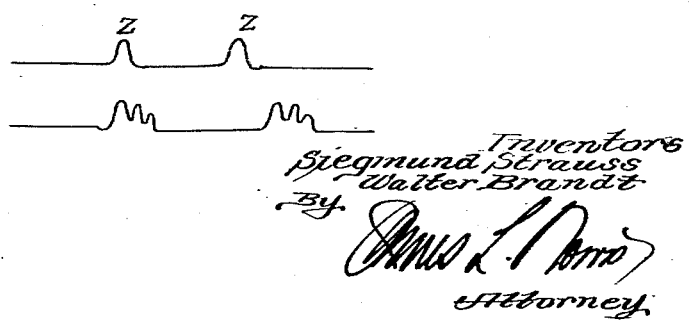
Fig. 3 shows by diagrams the fluctuations of the current intensity during the charging and discharging period.

Fig. 3 shows diagrammatically the current intensity curve. Each increase Z thereof corresponds with the charging period of the condenser each time the current flow through the tube is started. The horizontal line in this figure corresponds to the discharge period when the current flow in the plate circuit is completely interrupted.

It is to be seen that this discharge period is much longer than the charging period and that if simply the number of charges of the condenser is counted, this will enable the observer to obtain a very good indication of the length of the discharge period. It may be pointed out that in reality the horizontal portions of the line in this figure representing the length of the discharge period are much longer than represented in the diagram, if the resistance is a very high one. The diagram is relatively shortened to allow representation on the drawing.

What I claim is:

1. A method of making electrical measurements of the kind specified by means of an electronic discharge tube having a grid electrode controlling the flow of current through said tube, which consists in causing the grid to be alternately provided with a negative electric charge and to be discharged at regular intervals over a leak path containing the object to be measured, thus making said intervals dependent upon the electrical properties of said object, and measuring the time interval between subsequent discharges.

2. A method of making electrical measurements of the kind specified by means of an electronic discharge tube having a grid electrode controlling the flow of current through said tube which consists in causing the grid of said tube to be alternatively charged to a negative value capable of suppressing the flow of current through said tube and to be discharged over a leak path containing the object to be measured, thus determining the duration of said discharges, and counting the number of current impulses during a time unit.

3. Means for effecting electrical measurements of the kind specified, consisting of an electronic discharge tube and means for causing an intermittency of the current flowing through said electronic discharge tube comprising a grid electrode capable of stopping said flow of current when provided with a negative charge and of allowing restitution of such current flow when said charge has been carried off, a leak path connected with said grid and containing the object to be measured, and means for indicating each restitution of the current flow through said tube.

4. Means for effecting electrical measurements of the kind specified consisting of an electronic discharge tube provided with an anode and a cathode connected with a source of current and means for causing an interruption of the current flowing through said tube, at regular intervals, comprising a grid electrode capable of stopping said flow of current when provided with a negative charge, a grid circuit connected with the grid and the cathode and containing a grid condenser, a leak path containing the object to be measured forming a shunt to said grid condenser, and means for indicating the duration of the regular intervals between two subsequent current flows.

5. Means for effecting electrical measurements of the kind specified consisting of an electronic discharge tube provided with an anode and a cathode connected with a circuit embodying a source of current, means for causing an interruption of the anode current at regular intervals comprising a grid electrode in said tube, means for impressing a negative charge upon said grid electrode, means for discharging the grid charge over the object to be measured aperiodically, and means to indicate the number of such discharges.

6. An ohmmeter for measuring high electrical resistances consisting of an electronic discharge tube provided with an anode and a cathode connected with a circuit embodying a source of current, means for causing an interruption of the anode current at regular intervals comprising a grid electrode in said tube, means responsive to each restitution of the current flow to impress a negative charge upon said grid, and means for making the intervals of time between the interruption and the restitution of the flow of current through the tube dependent upon the value of the electrical resistance to be measured.

7. Means for effecting electrical measurements of the kind specified consisting of an electronic discharge tube provided with an anode and a cathode, a circuit connected therewith and embodying a source of direct current, means for causing an intermittent flow of direct current through said electronic discharge tube comprising a grid electrode capable of stopping the flow of current when provided with a negative charge and of allowing restitution of such flow when such charge has been carried off, means for impressing a negative charge capable of stopping the flow of current upon said grid electrode comprising an induction coil operatively connected with the above named circuit and with the grid, a leak path containing the object to be measured to carry off said negative charge, and means to indicate each restitution of the flow of direct current through the discharge tube.

8. Means for effecting electrical measurements of the kind specified according to claim 7 wherein the induction coil comprises a primary connected with the direct current supply circuit of the discharge tube and a secondary circuit connected with the grid.

9. An ohmmeter for measuring high resistances comprising an electronic discharge tube provided with an anode and a cathode, a direct current supply circuit for said discharge tube, means for causing an intermittent flow of direct current through said discharge tube comprising a grid electrode and a grid circuit between said cathode and said grid, an induction coil responsive to the restitution of current through the discharge tube, part of said induction coil being inserted in the grid circuit, a grid condenser in said grid circuit inserted between said grid and the above named part of the induction coil, a by-pass to said grid condenser through the resistance to be measured capable of carrying off the negative charge of the grid within a time depending upon the value of said resistance, and an indicating device for indicating the interval between two subsequent discharges and thereby indicating the value of such resistance.

10. An ohmmeter according to claim 9, wherein the induction coil consists of two windings connected in the manner of an autotransformer.

11. An ohmmeter according to claim 9 wherein the induction coil comprises a primary and a secondary winding connected in the manner of an autotransformer, the primary winding being connected with the direct current supply circuit of the discharge tube, the secondary winding being connected with the grid circuit theerof.

12. An ohmmeter according to claim 5 wherein the indicator consists of a telephone.

13. An apparatus according to claim 6 wherein the electrical resistance consists of an ionizing chamber influenced by Röntgen rays, the intensity of the Röntgen rays influencing the value of the electrical resistance of such ionizing chamber.

In testimony whereof we affix our signatures.

Ing. SIEGMUND STRAUSS.
Dr. Ing. WALTER BRANDT.